April 14, 1970     H. J. SHAW     3,506,858

PIEZOELECTRIC SHEAR WAVE TRANSDUCER

Filed April 17, 1968

INVENTOR
HERBERT JOHN SHAW

BY *Harry A. Herbert Jr*

ATTORNEY

United States Patent Office 3,506,858
Patented Apr. 14, 1970

3,506,858
PIEZOELECTRIC SHEAR WAVE TRANSDUCER
Herbert John Shaw, Stanford, Calif., assignor to the United States of America as represented by the Secretary of the Air Force
Filed Apr. 17, 1968, Ser. No. 721,973
Int. Cl. H01v 7/00
U.S. Cl. 310—8.6      4 Claims

ABSTRACT OF THE DISCLOSURE

Two transducer discs, separated by a passive member, are so oriented that the linearly polarized shear waves which they generate will be polarized at right angles in space with respect to one another. The passive spacer introduces a time delay which causes a rotating field to be set up. The discs, driven by an RF field, would resultantly generate circularly polarized shear waves in a solid rod.

BACKGROUND OF THE INVENTION

The present invention pertains to a means for efficiently exciting circularly polarized shear waves in solids at microwave frequencies. Formerly, this has been done by magnetostrictive transducers which are known to be inherently capable of exciting circularly polarized shear waves. However, the magnetostrictive technique requires the use of a magnetic field and does not have a high coupling efficiency.

Many of these difficulties and restrictions are overcome by the use of piezoelectric transducers. This type of transducer is unaffected by either thermal shock or magnetic field and can be operated at is fundamental resonant frequency or at high frequencies with high efficiency for either compressional or shear waves. Prior art piezoelectric transducers are not known to generate circularly polarized shear waves.

BRIEF SUMARY OF THE INVENTION

In the circularly polarized shear wave transducer of the present invention, two shear wave transducer discs are separated by a passive spacer. The thickness of the shear wave active discs and the passive spacer are such as to give optimum efficiency at the center frequency of the frequency band of interest. The two shear wave transducers have their stress axes oriented so that the linearly polarized shear waves which they generate will be polarized at right angles in space with respect to one another.

Thus, it is an object of this invention to take advantage of the high coupling efficiencies available in piezoelectric transducers for the purpose of exciting circularly polarized shear waves.

BRIEF DESCRIPTION OF THE DRAWINGS

The features of the invention are better understood from the following description of the preferred embodiment taken in conjunction with the accompanying drawings in which.

DESCRIPTION OF THE PREFERRED EMBODIMENT

Figure 1:
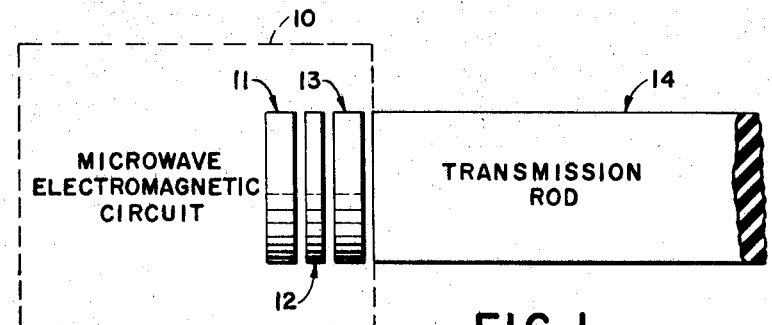
FIGURE 1 illustrates the general method of exciting circularly polarized shear waves in a solid rod.
Figure 2:
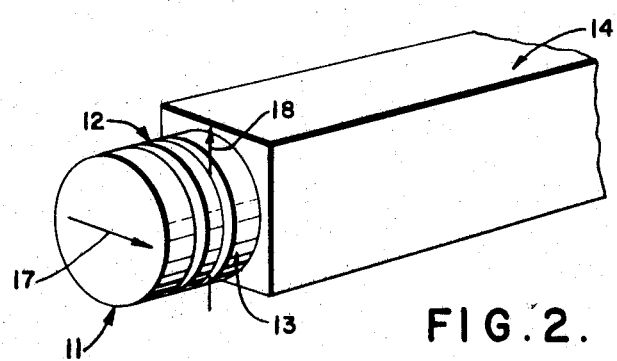
FIGURE 2 is an exploded view of the transducer discs showing typical orientations.

Referring now to FIGURES 1 and 2, a typical embodiment of a circularly polarized shear wave transducer is shown. Transducer discs 11 and 13 are separated by passive spacer 12. Transducer disc 11 is shown with its stress axis oriented horizontally while transducer disc 13 is shown with its stress axis 18 oriented vertically. These discs are typically one-half acoustic wavelength in thickness at the center frequency of the frequency band of interest. Passive disc 12 has a thickness of one-quarter acoustic wavelength, so that the phase shift from the transmisison of traveling acoustic waves through this passive disc will be 90° at the center frequency of the system. This passive spacer introduces a time delay which causes a rotating field to be set up.

Figure 3:
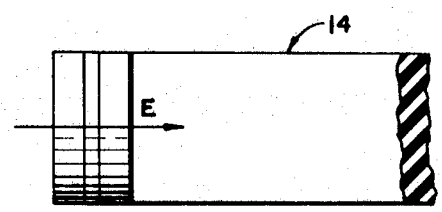
FIGURE 3 shows the orientation of the RF electric field of the microwave electromagnetic circuit.

The active transducer discs 11 and 13 are of a piezoelectric material and are driven by the RF electric field of a microwave electromagnetic circuit 10 having its RF electric field oriented along the axis of the transmission system, as indicated in FIGURE 3. Discs 11 and 13 are constructed of oriented material with the piezoelectric axes oriented so that on the application of the axial field E, linearly polarized transverse stresses with a given spatial orientation in the transverse plane are generated, and this transverse orientation corresponds to stress axes, 17 and 18. The two active discs are then rotated in their planes about the longitiudinal axis until their two stress axes are orthogonal as illustrated in FIGURE 2.

In operation, the forces produced by disc 13 will be polarized at right angles in space to the forces produced by disc 11 because of the relative 90° rotation of the stress axes of the two discs. Therefore these forces produced in discs 11 and 13 will be at right angles when they are imparted to solid rod 14. The forces produced in disc 11 and 13 generate acoustic traveling waves which are transmitted along the solid rod 14. The waves generated at a point in disc 13 are in phase with those generated at the same instant at the corresponding point in disc 11. However, because discs 13 and 11 are one-half wavelength in thickness and passive disc 12 is one-quarter wavelength in thickness, a wave generated at a point in disc 13 must travel a distance equal to three-quarters of a wavelength (270°) before it reaches the corresponding point in disc 11. Therefore the waves generated is disc 13 and transmitted to solid rod 14 will lag in time phase by 270° the waves generated in disc 11 and transmitted to solid rod 14. The overall effect of transmitting two acoustic traveling waves which are 270° out of phase down solid rod 14 is to generate an apparent rotating mechanical force field within solid rod 14. The rotation is with respect to the longitudinal axis of solid rod 14.

Figure 4:
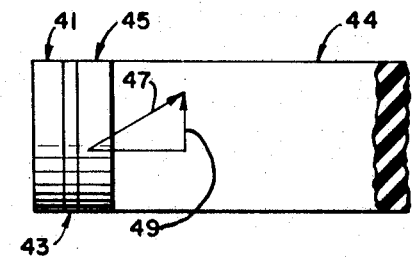
FIGURE 4 illustrates another embodiment of the invention.

In FIGURE 4, the active discs consist of oriented piezoelectric films, 41 and 45, while the passive disc is a thin film 43 and is made of nonpiezoelectric inactive material which might be either a metal or dielectric film. The active discs can be made of oriented thin films (such as CdS) deposited by the method in which the direction of the c-axis in the deposited thin film orients itself along the direction of approach of the particles from the evaporating source in a vacuum deposition system. Thus, a thin film sandwich can be fabricated by first depositing active film 45 on the transmission rod so that its c-axis, 47 is oriented as shown in FIGURE 4 and the transverse component of its c-axis 49 lies in the plane of the paper, also shown in FIGURE 4. After depositing passive film 43, active film 41 is then deposited with its c-axis so oriented that the transverse component of its c-axis vector would be normal to the plane of the paper.

Figure 5:
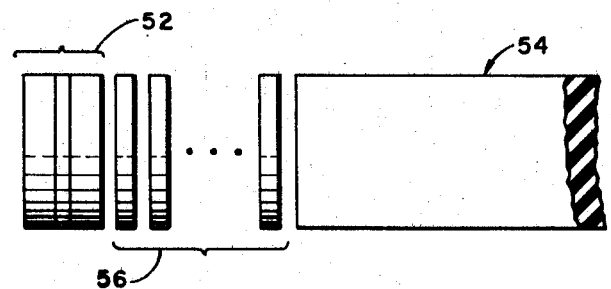
FIGURE 5 illustrates still another embodiment of the invention.

In FIGURE 5, maximum transducer efficiency is obtained by interposing impedance transforming films 56 between transmission rod 54 and the three film assembly 52. The impedance transforming films would typically be quarter wave films of various acoustic characteristic impedances which transform the characteristic impedance of the rod into an impedance which provides more efficient extraction of acoustic energy from the generating section.

In all cases it is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

What is claimed is:

1. A shear wave transducer comprising:
  (a) microwave electromagnetic circuit means having an RF electric field;
  (b) first and second juxtaposed disc means for generating linearly polarized shear waves;
  (c) each of said first and second active disc means including a stress axis in orthogonal relation;
  (d) said RF electric field driving said first and second active disc means ;
  (e) passive spacer means interposed between said first and second active disc means;
  (f) rod means for transmitting the shear waves generated by first and second disc means,
  (g) wherein the shear waves generated in said rod means by said first disc means are polarized at right angles to the shear waves generated by said second disc means.

2. The shear wave transducer defined by claim 1 in which said first and second disc means are of piezoelectric material.

3. The shear wave transducer defined by claim 1 in which
  (a) said first and second disc means are oriented piezoelectric thin films (such as CdS);
  (b) said passive disc means is a thin film of nonpiezoelectric inactive material;
  (c) said first and second oriented thin films and said nonpiezoelectric inactive material being deposited on said rod.

4. The shear wave transducer defined by claim 3 in which impedance transforming films are interposed between said rod and the arrangement of said first and second oriented thin films and said nonpiezoelectric inactive material.

References Cited

UNITED STATES PATENTS

| | | | |
|---|---|---|---|
| 2,672,590 | 3/1954 | McSkimin | 333—30 |
| 2,877,431 | 3/1959 | McSkimin | 333—30 |
| 3,185,942 | 5/1965 | White | 333—72 X |
| 3,240,962 | 3/1966 | White | 333—30 |
| 3,293,575 | 12/1966 | Albsmeier | 333—30 X |
| 3,405,374 | 10/1968 | Dayem et al. | 333—30 |
| 3,411,023 | 11/1968 | Quate | 333—72 X |
| 3,422,371 | 1/1969 | Poirier et al. | 333—72 X |

OTHER REFERENCES

Cadmium Sulphide Evaporated Layer Transducers by N. F. Foster, published in the proceedings of the IEEE, vol. 53, No. 10, October 1955, pp. 1400–1405.

MILTON O. HIRSHFIELD, Primary Examiner

M. O. BUDD, Assistant Examiner

U.S. Cl. X.R.

333—30